United States Patent
Schmitz et al.

(10) Patent No.: US 10,730,184 B2
(45) Date of Patent: Aug. 4, 2020

(54) ROBOT ARM CONTROL SYSTEM

(71) Applicant: WASEDA UNIVERSITY, Tokyo (JP)

(72) Inventors: Alexander Schmitz, Tokyo (JP); Soumya Bhavaraju, Tokyo (JP); Yoshihiro Sakamoto, Tokyo (JP); Gonzaro Aguirre Dominguez, Tokyo (JP); Ritsuki Sato, Tokyo (JP); Wei Wang, Tokyo (JP); Shigeki Sugano, Tokyo (JP)

(73) Assignee: WASEDA UNIVERSITY, Tokyo (JP)

( * ) Notice: Subject to any disclaimer, the term of this patent is extended or adjusted under 35 U.S.C. 154(b) by 328 days.

(21) Appl. No.: 15/741,353

(22) PCT Filed: May 23, 2016

(86) PCT No.: PCT/JP2016/065125
§ 371 (c)(1),
(2) Date: Jan. 2, 2018

(87) PCT Pub. No.: WO2017/006636
PCT Pub. Date: Jan. 12, 2017

(65) Prior Publication Data
US 2018/0370031 A1 Dec. 27, 2018

(30) Foreign Application Priority Data
Jul. 4, 2015 (JP) ................................. 2015-134828

(51) Int. Cl.
*B25J 9/16* (2006.01)
*B25J 13/08* (2006.01)
(Continued)

(52) U.S. Cl.
CPC ........... *B25J 9/1633* (2013.01); *B25J 9/1676* (2013.01); *B25J 13/085* (2013.01);
(Continued)

(58) Field of Classification Search
CPC .................................. B25J 9/16; B25J 13/08
See application file for complete search history.

(56) References Cited

U.S. PATENT DOCUMENTS 5,994,864 A * 11/1999 Inoue ..................... B25J 9/1633
318/568.2
9,447,849 B1 * 9/2016 Edsinger ................ B25J 9/1045
(Continued)

FOREIGN PATENT DOCUMENTS

JP 8-323663 A 12/1996
JP 2009-12088 A 1/2009
(Continued)

OTHER PUBLICATIONS

International Search Report dated Aug. 16, 2016, issued in counterpart International Application No. PCT/JP2016/065125 (1 page).
(Continued)

*Primary Examiner* — Kira Nguyen
(74) *Attorney, Agent, or Firm* — Westerman, Hattori, Daniels & Adrian, LLP

(57) ABSTRACT

A control system (10) according to the present invention includes a robot arm (11) provided in a manner capable of moving in a given space, a motor (14) for operating the robot arm (11), a torque adjustment device (16) for operating in a manner capable of adjusting a transmitted torque that is transmitted from the motor (14) to the robot arm (11), and a control device (19) for performing operation control of the robot arm (11). The robot arm (11) is provided with a gravity-compensating mechanism (12) for cancelling an effect of gravity due to the robot arm (11), and the control device (19) commands adjustment of the transmitted torque at the torque adjustment device (16), without taking into account the effect of the gravity of the robot arm (11).

6 Claims, 2 Drawing Sheets

(51) Int. Cl.
*B25J 19/00* (2006.01)
*B25J 19/06* (2006.01)

(52) U.S. Cl.
CPC ......... *B25J 19/0008* (2013.01); *B25J 19/068* (2013.01); *G05B 2219/37624* (2013.01); *G05B 2219/39322* (2013.01); *G05B 2219/40201* (2013.01); *G05B 2219/41259* (2013.01); *G05B 2219/50196* (2013.01)

(56) References Cited

U.S. PATENT DOCUMENTS

| | | | |
|---|---|---|---|
| 2013/0057004 A1* | 3/2013 | Murata | B25J 15/0009 |
| | | | 294/106 |
| 2013/0110128 A1 | 5/2013 | Schostek et al. | |
| 2015/0107395 A1 | 4/2015 | Kermani et al. | |
| 2015/0177084 A1 | 6/2015 | Inoue | |
| 2016/0067865 A1* | 3/2016 | Osada | B25J 9/1641 |
| | | | 700/254 |

FOREIGN PATENT DOCUMENTS

| | | |
|---|---|---|
| JP | 2013-66987 A | 4/2013 |
| JP | 2013-169628 A | 9/2013 |

OTHER PUBLICATIONS

Extended European Search Report dated Aug. 28, 2018, issued in counterpart EP Application No. 16821107.6 (26 pages).
Japanese Office Action dated May 8, 2019, issued in counterpart Japanese Application No. 2015-134828 (5 pages).

* cited by examiner

ROBOT ARM CONTROL SYSTEM

TECHNICAL FIELD

The present invention relates to a robot arm control system, and more specifically, to a robot arm control system which is capable of performing position control and force control of a robot arm by simple computational processing while taking safety into account.

BACKGROUND ART

In an environment where robots and humans coexist, safety measures of the robots for the environment are important. As such safety measures, a compliance function for buffering a collision is necessary for when a robot suddenly collides into a human or an object in an environment while performing a desired operation. As the compliance function, an elastic element such as a spring for mitigating the impact of a collision is typically attached to a robot arm which is a movable part of a robot, for example. However, in the case of using the spring to mitigate an impact, the elasticity of the spring has to be adjusted during operation of the robot, for example, by increasing the cushioning property by weakening the spring at the time of collision, and this may become one factor which makes position control of the robot arm difficult. Moreover, the elastic element such as the spring makes acceleration operation of the robot less speedy, and also, may become a factor for causing vibration at the time of operation of the robot.

Patent Literature 1 discloses a robot including a collision torque buffer mechanism for relieving a force acting on an object or the like when a robot hand collides into another object or the like with an external force of given magnitude or more. With the collision torque buffer mechanism, a connection portion between a robot hand side and a robot arm side is filled with a lubricating agent, and a coupled state between the robot hand side and the robot arm side is maintained due to the viscosity of the lubricating agent even when an external force of certain magnitude is applied to the robot arm side, but when an external force exceeding the external force of certain magnitude is applied, relative rotation between the robot hand side and the robot arm side is allowed to buffer the force that acts on an object at the time of collision.

CITATION LIST

Patent Literature

Patent Literature 1: Japanese Patent Laid-Open No. 2009-12088

SUMMARY OF INVENTION

Technical Problem

With the collision torque buffer mechanism of Patent Literature 1, a torque value that allows relative rotation between the robot hand side and the robot arm side is determined by the viscosity of the lubricating agent, and is set to a constant value for each product. Accordingly, to make the torque value variable according to the operation mode of the robot, it is conceivable to alternatively use, in the configuration of Patent Literature 1, an electromagnetic clutch for connecting the robot hand side and the robot arm side, so as to enable electrical adjustment of a torque transmitted to the robot hand side from the robot arm side that is operated by a motor or the like. However, in such a case, from the standpoint of safety, a connected state between the robot hand side and the robot arm side has to be maintained even when supply of power to the electromagnetic clutch is stopped, causing further structures to be necessary. Moreover, physical computation based on operation of the robot is necessary at the time of issuance of an operation command to the electromagnetic clutch so as to control the torque to a desired state, but moment calculation that takes into account the effect of the weight of the robot, i.e., complex computation that is different according to the posture or operation of the robot, becomes necessary, resulting in a problem that position control and force control of the robot become extremely difficult.

The present invention has been made to solve the problem as described above, and has its object to provide a robot arm control system which is capable of realizing position control and force control of a robot arm by a simple configuration while taking safety into account.

Solution to Problem

To achieve the object described above, the present invention mainly adopts a configuration of a robot arm control system including a robot arm provided in a manner capable of moving in a given space, a motor for operating the robot arm, a torque adjustment device for operating in a manner capable of adjusting a transmitted torque that is transmitted from the motor to the robot arm, and a control device for performing operation control of the robot arm, where the robot arm is provided with a gravity-compensating mechanism for cancelling an effect of gravity due to the robot arm, and where the control device issues a command for adjustment of the transmitted torque at the torque adjustment device, without taking into account the effect of the gravity of the robot arm.

Advantageous Effects of Invention

According to the present invention, the torque adjustment device capable of adjusting a transmitted torque that is transmitted from the motor to the robot arm, and the gravity-compensating mechanism for cancelling an effect of gravity of the robot arm are used in combination, and thus, position adjustment of the robot arm and adjustment of the transmitted torque by the torque adjustment device may be performed by simple computational processing not taking into account the effect of gravity of the robot arm. Position control of the robot arm may be performed by adjustment of driving of the motor, and force control of the robot arm, which takes compliance and the like into account, may be performed by adjustment of the transmitted torque by the torque adjustment device, and position control and force control of the robot arm may be performed in a simple manner with no complex relationship between position adjustment and force adjustment of the robot arm. Furthermore, by allowing intentional slippage of a connection state of the motor and the robot arm by the torque adjustment device, an external force acting on the robot arm and the weight of an object grasped by the robot arm may be detected. Moreover, because the weight of the robot arm is compensated for by the gravity-compensating mechanism, compared with a case where the gravity-compensating mechanism is not provided, a torque limit value of the torque adjustment device may be made smaller under the same condition.

DESCRIPTION OF EMBODIMENT

Hereinafter, an embodiment of the present invention will be described with reference to the drawings.

Figure 1:
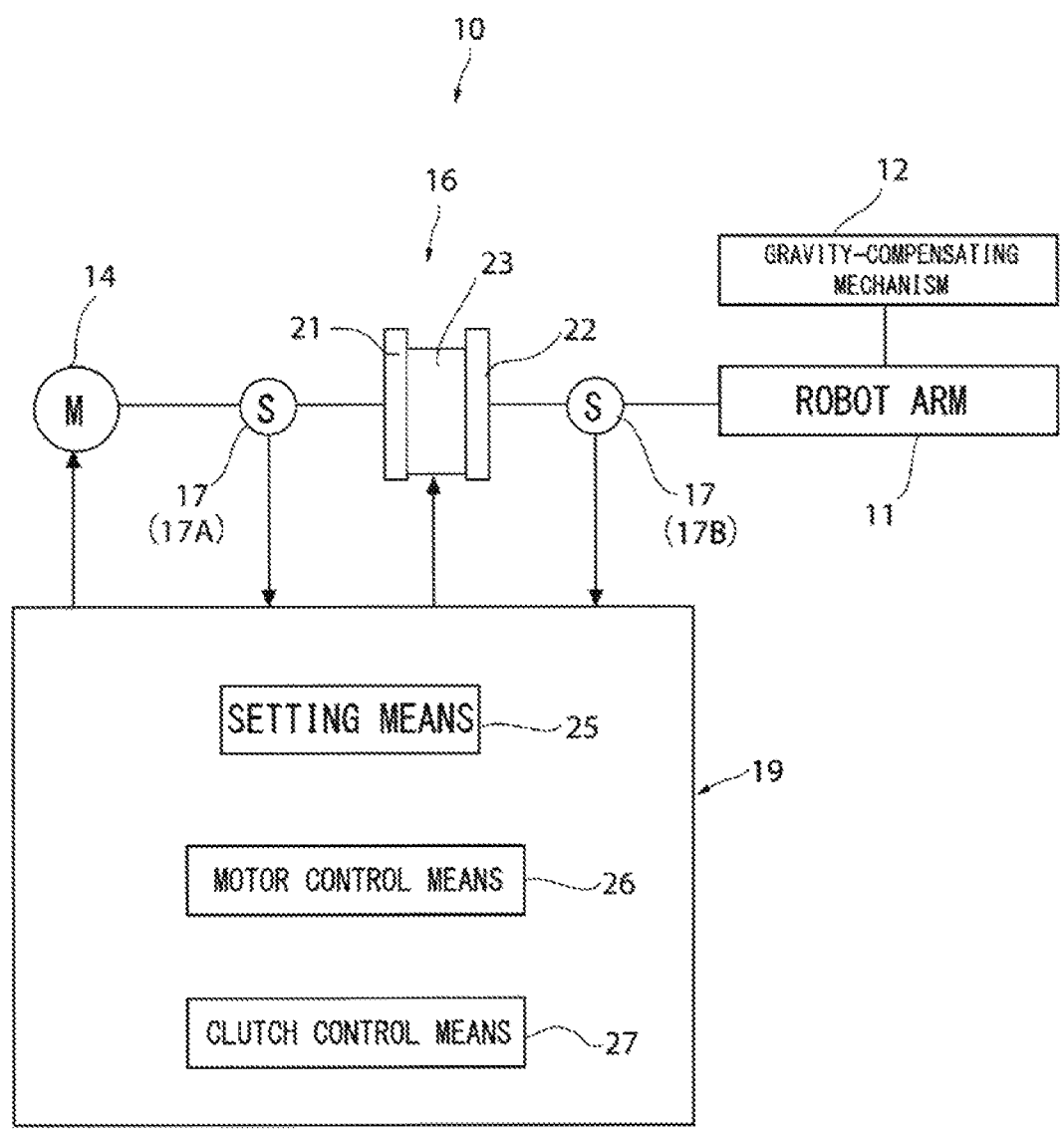
FIG. 1 is a block diagram schematically showing a configuration of a robot arm control system according to a present embodiment.

FIG. 1 shows a block diagram schematically showing a configuration of a robot arm control system according to the present embodiment. In the drawing, the control system 10 includes a robot arm 11, provided in a manner capable of moving in a given space, for performing a given task in the space, a gravity-compensating mechanism 12, provided at the robot arm 11, for cancelling an effect of gravity due to the robot arm 11, a motor 14 which is rotated to provide power for the robot arm 11, a torque adjustment device 16, disposed between the robot arm 11 and the motor 14, for operating in a manner capable of adjusting a transmitted torque that is transmitted from the motor 14 to the robot arm 11, a sensor 17 for detecting a displacement state on an input side and an output side of the torque adjustment device 16, and a control device 19 for performing operation control of the robot arm 11. Additionally, the gravity-compensating mechanism 12, the motor 14, the torque adjustment device 16, and the sensor 17 are, but not necessarily, provided near the robot arm 11, such as at a joint portion or a periphery thereof.

The robot arm 11 is configured from a known power transmission mechanism which allows movement, by power from the motor 14, in a given space while causing a joint portion to rotate. A detailed structure of the robot arm 11 is not an essential part of the present invention, and illustration and detailed description of the structure are omitted. Additionally, as the robot arm 11, a configuration can be cited as an example, which is capable of moving, by a cantilever articulated structure including an object grasping unit at a distal end, by an operation commanded in advance, an object (grasped object) grasped by the grasping unit in a given space.

The gravity-compensating mechanism 12 is configured from a known mechanism which is capable of performing adjustment to cancel an effect on the gravity of the entire robot arm 11 including the weight of the robot arm 11 and the weight of the grasped object. In the present embodiment, a spring balance type gravity-compensating mechanism having a link structure that uses a spring is adopted. As the gravity-compensating mechanism 12, other than a mechanism according to which tension of a spring is adjusted in advance so as to compensate only for the weight of the robot arm 11, an adjustable weight compensating mechanism which is capable of dynamically adjusting the tension of a spring according to the weight of a grasped object may be adopted in a case where weight compensation is to be performed by also taking into account the weight of the grasped object. Moreover, the present invention is not limited thereto, and gravity-compensating mechanisms 12 of various structures, such as a mechanism of a counter weight type, may be adopted as long as the same effect is achieved.

The torque adjustment device 16 couples the robot arm 11 side and the motor 14 side, and also, operates to cause values of an input torque input from a rotational shaft (not shown) on the motor 14 side and an output torque output to a rotational shaft (not shown) on the robot arm 11 side to be the same when a given torque limit value is not reached, and to reduce the value of the output torque compared with the value of the input torque when the torque limit value is exceeded. The torque limit value can be adjusted based on a command from the control device 19. A relationship between control command values regarding a current, a voltage and the like for the torque adjustment device 16 and the output torque relative to the input torque, including the torque limit value, is stored as a given function in the control device 19 based on a model that is set in advance.

In the present embodiment, the torque adjustment device 16 is configured from a clutch, and includes an input unit 21 joined on the motor 14 side so as to be rotatable by driving of the motor 14, an output unit 22 rotatably joined on the robot arm 11 side, and a transmission unit 23 disposed between the input unit 21 and the output unit 22 in a manner capable of transmitting power from the input unit 21 to the output unit 22.

The output unit 22 integrally rotates with the input unit 21 when the input torque due to rotation of the input unit 21 is at or below the torque limit value controlled by the control device 19, and slips to allow relative rotation with respect to the input unit 21 when the input torque exceeds the torque limit value. Additionally, as the torque adjustment device 16, for example, a friction clutch which electrically adjusts a friction force of the transmission unit 23, or a magnetic fluid clutch which electrically adjusts the viscosity of a magnetic fluid as the transmission unit 23 may be adopted, and moreover, various clutches, torque limiters, brakes and the like may be adopted as long as the transmitted torque from the input unit 21 to the output unit 22 may be adjusted in a manner as described above. Particularly, as the clutch, one that can adjust the transmitted torque while further taking into account a static friction force and a dynamic friction force of the transmission unit 23, or one that can adjust the transmitted torque while further taking into account a slip speed which is a relative rotation speed between the input unit 21 and the output unit 22 at the time of slippage of the torque adjustment device 16 may be adopted, for example.

The sensor 17 is not particularly limited as long as the sensor is capable of detecting information for performing control described below of the control device 19. In the present embodiment, an encoder provided on each of input/output sides of the torque adjustment device 16 is used as the sensor 17. An input side encoder 17A disposed on the input side of the torque adjustment device 16 detects rotational angular displacement of the input unit 21, and an output side encoder 17B disposed on the output side of the torque adjustment device 16 detects rotational angular displacement of the output unit 22, and detection values of each encoder 17A, 17B are successively transmitted to the control device 19.

The control device 19 is configured from a computer including an arithmetic processing device such as a CPU, a storage device such as a memory or a hard disk, and the like, and performs operation control of the torque adjustment device 16 without taking into account an effect of gravity due to the robot arm 11. Moreover, in the present case, adjustment of the transmitted torque by the torque adjustment device 16 is performed by selecting one of control according to a first control mode in which position control of the robot arm 11 is performed while taking safety into account, and control according to a second control mode in which force control of the robot arm 11 is performed by adjusting the magnitude of the output torque relative to the input torque.

The control device 19 includes setting means 25 for artificially and/or automatically setting a target operation, an operation mode or the like of the robot arm 11, motor control means 26 for performing driving control of the motor 14, and clutch control means 27 for performing operation control of the torque adjustment device 16.

Following control is performed in the first control mode.

The motor control means 26 determines target rotation values (target rotation angle, target rotation speed, and target rotation acceleration) for a joint portion of the robot arm 11 relative to time in order to specify a temporal target position of the robot arm 11, according to the target operation of the robot arm 11 set by the setting means 25. Furthermore, a rotation angle from the output side encoder 17B corresponding to current position information of the robot arm 11 is fed back, and a target torque which is the output torque from the torque adjustment device 16 required by rotation operation of the robot arm 11 is determined by computation front the target rotation values and the current position information of the robot arm 11 and a known inertia tensor of the robot arm 11 or the like. Then, a drive command is issued to the motor 14 such that the target torque is obtained, and position control of the robot arm 11 is performed.

The clutch control means 27 adjusts the torque limit value of the torque adjustment device 16 in the following manner. In the present case, the torque limit value is determined such that, when a torque which is slightly greater than the target torque according to driving of the motor 14 determined by position control of the robot arm 11 described above acts on the torque adjustment device 16, relative rotation of the output unit 22 with respect to the input unit 21 is allowed and the torque adjustment device 16 is caused to slip. That is, the torque limit value is determined by multiplying the target torque by a given gain, and operation of the torque adjustment device 16 is adjusted based on the model mentioned above such that slippage is caused at the torque limit value. The torque limit value here is set slightly greater than the target torque, taking into account an error in the model or electrical noise, for example.

In the first control mode, at the time of movement of the robot arm 11 to a desired position, if a sudden external force is not applied to the robot arm 11, such as when a human or an object such as an obstacle in the environment is not coming into contact with or colliding into the robot arm 11, the input unit 21 is rotated at the target torque determined based on the position control described above. The target torque is smaller than the torque limit value set in the present mode, and thus, the input unit 21 and the output unit 22 rotate in an integrated manner, and the torque is transmitted from the output unit 22 to the robot arm 11 with the value of the target torque approximately coinciding with the value of the output torque, and desired position control of the robot arm 11 is thereby performed. On the other hand, when an external force is applied to the robot arm 11 due to collision with a human or an object, the robot arm 11 does not reach an intended position, and the driving torque of the motor 14 is increased by position control based on feedback of the position information of the robot arm 11 so as to urge movement of the robot arm 11. However, the value of the input torque to the input unit 21 which is accordingly increased exceeds the torque limit value which is set, causing the torque adjustment device 16 to slip, and the increased input torque is not transmitted to the robot arm 11 side as it is, and an impact applied to a human or an object by the robot arm 11 can be mitigated.

According to the first mode described above, when the robot arm 11 suddenly collides into a human, an object or the like in the environment during the process of position control of the robot arm 11, the torque adjustment device 16 is caused to slip to mitigate the force of impact at the time of collision, and thus, safety can be secured at the time of operation of the robot arm 11 which is subjected to position control. Additionally, torque transmission from the input unit 21 to the output unit 22 may be interrupted when slippage of the torque adjustment device 16 is detected, so as to cause the output unit 22 to freely rotate according to the external force.

Following control is performed in the second control mode.

When the second control mode is selected, the motor control means 26 performs position control of the robot arm 11 in the same manner as the first control mode, and the clutch control means 27 controls operation of the torque adjustment device 16 such that a desired torque is output from the robot arm 11 even when the robot arm 11 comes into contact with a human or an object in the environment. At this time, at the clutch control means 27, a torque limit value lower than the input torque value for the input unit 21 according to driving of the motor 14 is set so as to enable slippage of the torque adjustment device 16. Moreover, the transmission unit 23 is electrically commanded based on the model, and the output torque of the output unit 22 joined to the robot arm 11 is adjusted to a desired value in a range smaller than the input torque of the input unit 21 by the action of the transmission unit 23, such as adjustment of viscosity or increase or decrease of friction, and desired force control is performed on the robot arm 11. In other words, when a desired operation state for when the robot arm 11 comes into contact with a human or an object is set at the setting means 25, a target torque for the rotation operation of the robot arm 11 according to the operation state is specified. Then, the clutch control means 27 issues a command to the torque adjustment device 16 such that the output torque of the output unit 22 takes approximately the same value as the target torque, and the robot arm 11 is rotated at the target torque.

In the second control mode, operation control of the torque adjustment device 16 may be performed by determining the slip speed of the torque adjustment device 16 based on detection values of the input side encoder 17A and the output side encoder 17B, specifying an actual torque value at the time of actual operation of the robot arm 11 based on the slip speed, and feeding back the actual torque value to the clutch control means 27. Moreover, in this case, a configuration may be adopted in which a torque sensor capable of measuring the actual torque value of the robot arm 11 is provided, and the measurement value is fed back to the clutch control means 27.

Furthermore, in a case where a torque adjustment device 16 having a property according to which the transmitted torque is changed according to the slip speed is adopted, a slip speed determined from the detection values of the input side encoder 17A and the output side encoder 17B is input to the clutch control means 27, and the torque adjustment device 16 is controlled such that the robot arm 11 is operated at the target torque, while further taking into account the slip speed.

In the second control mode, in the case where a condition is set such that the robot arm 11 is moved to a desired position even when an obstacle comes into contact with the robot arm 11, such as when the robot arm 11 is used to bring down a building, the torque adjustment device 16 is set in a state where the input unit 21 and the output unit 22 are firmly coupled to each other so that the loss in the transmitted torque from the input unit 21 to the output unit 22 is reduced. On the other hand, in the case where the robot arm 11 is desired to be easily moved by an external force, such as in the case of a teaching operation, the torque adjustment device 16 is set in a state where the input unit 21 and the output unit 22 are weakly coupled to each other so that the loss in the transmitted torque from the input unit 21 to the output unit 22 is increased.

Additionally, in the present embodiment, various control modes may be adopted toy the control device 19. For example, in the case of use as a rehabilitation robot for a person with a movement disorder, the operation of the torque adjustment device 16 may be adjusted such that an external force is applied to the robot arm 11 by a disabled body part, such as an arm or a leg, without driving of the motor 14, and such that the level of the coupled state of the input unit 21 and the output unit 22 is changed according to the level of disorder or the level of recovery. Moreover, as in the case of a power assist robot, when an external force is applied to the robot arm 11 from a human in a state where the motor 14 is not driven, the target torque of the motor 14 for operating the robot arm 11 may be determined based on the slippage of the torque adjustment device 16. Furthermore, to effectively transmit the force of the motor 14, power transmission at the torque adjustment device 16 may be interrupted at the start of rotation of the motor 14, and power transmission at the torque adjustment device 16 may be gradually performed when the motor 14 reaches a certain level of rotational speed.

Figure 2:
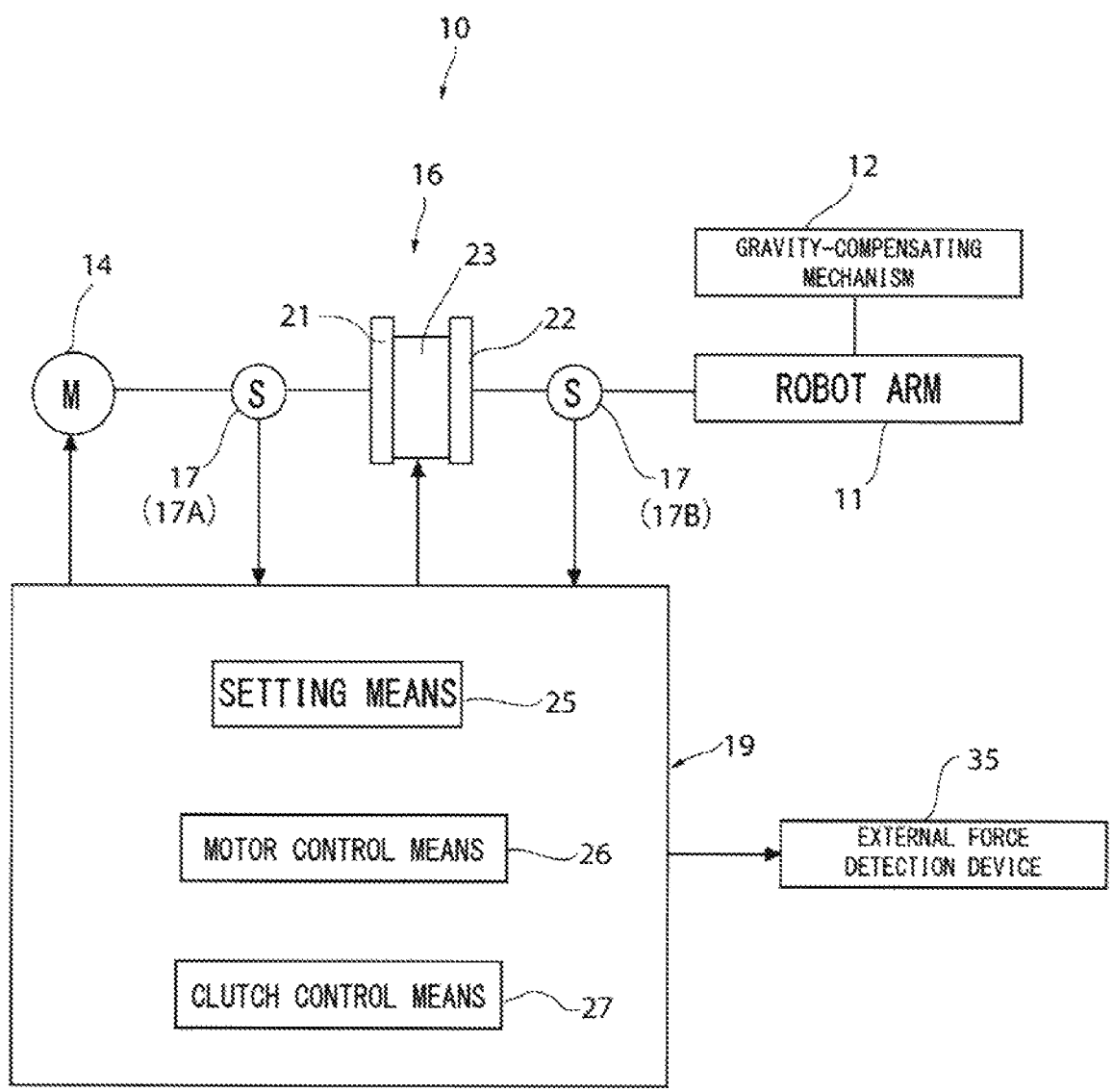
FIG. 2 is a block diagram according to a modification, similar to that in FIG. 1.

Next, as shown in FIG. 2, as a modification of the control system 10, an external force detection device 35 for detecting an external force acting on the robot arm 11, based on operation of the torque adjustment device 16, may be further provided in the configuration of the embodiment described above. The external force detection device 35 may be provided in a computer the same as the computer of the control device 19, or may be separately provided.

With the control device 19 according to the modification, selection of control according to a third control mode is further enabled, in which operation control of the motor 14 and the torque adjustment device 16 is performed for detection of an external force by the external force detection device 35.

In the present modification, the torque adjustment device 16 may be caused to slip, and the external force acting on the robot arm 11 or the weight of a grasped object may be determined by one of following first to third methods.

With the first method, operation control of the motor 14 and the torque adjustment device 16 is performed by the motor control means 26 and the clutch control means 27 such that the torque limit value is gradually reduced without the rotation state of the input unit 21 of the torque adjustment device 16 being changed from a state where the input unit 21 and the output unit 22 are rotated in an integrated manner. The external force detection device 35 determines the external force in the manner described below, from the torque limit value at the time of start of relative rotation of the input unit 21 and the output unit 22, i.e., at the time start of slippage of the torque adjustment device 16. The torque limit value at this time can be specified based on the model by detection of a control command value regarding a current, a voltage or the like applied to the clutch control means 27, and is the same as the total acting torque value acting on the entire robot arm 11 at a current time point. Moreover, the size and the inertia tensor of the robot arm 11 are known, and the rotation angle, the angular rotational speed, the angular rotational acceleration and the like of the robot arm 11 are specified based on detection of the output side encoder 17B, and these are used in computation of an internal torque value of the operation of the robot arm 11 itself. By subtracting the internal torque value from the torque limit value corresponding to the total acting torque value, an external torque value based on contact of the robot arm 11 with the outside is determined. The external force and the weight of a grasped object are determined by computation from the external torque value.

With the second method, operation control of the motor 14 and the torque adjustment device 16 is performed by the motor control means 26 and the clutch control means 27 such that the torque adjustment device 16 slips while maintaining a rotation state of the input unit 21. When an external force acts on the robot arm 11, or a grasped object having a certain weight is held, the slip speed of the torque adjustment device 16 is changed, and the angular rotational acceleration of the robot arm 11 at the time is detected by the output side encoder 17B. The external force detection device 35 computes the total acting torque value from the angular rotational acceleration of the robot arm 11 and the known moment of inertia of the robot arm 11, and in the same manner as the first method, the external torque value is determined by subtracting the internal torque value from the total acting torque value, and the external force or the weight of a grasped object is determined.

With the third method, operation control of the motor 14 and the torque adjustment device 16 is performed by the motor control means 26 and the clutch control means 27 such that the torque adjustment device 16 slips while maintaining a rotation state of the input unit 21. Then, when the torque limit value and the total acting torque value reach a balanced state, and the slip speed of the torque adjustment device 16 becomes constant, the torque limit value at this time is specified as the total acting torque value, and the external torque value is determined in the same manner as each of the methods described above, and the external force or the weight of a grasped object is determined.

Additionally, the configuration of each part of the device according to the present invention is not limited to the illustrated exemplary configuration, and can be subjected to various changes as long as substantially similar effects can be obtained.

REFERENCE SIGNS LIST 10 control system
11 robot arm
12 gravity-compensating mechanism
14 motor
16 torque adjustment device
17 sensor
19 control device
21 input unit
22 output unit
23 transmission unit
35 external force detection device

The invention claimed is:

1. A robot arm control system comprising:
   a robot arm provided in a manner capable of moving in a given space;
   a motor for operating the robot arm;
   a torque adjustment device for operating in a manner capable of adjusting a transmitted torque that is transmitted from the motor to the robot arm; and
   a control device for performing operation control of the robot arm, wherein the robot arm is provided with a gravity-compensating mechanism for cancelling an effect of gravity due to the robot arm, and wherein the control device issues a command for adjustment of the transmitted torque at the torque adjustment device, without taking into account the effect of the gravity of the robot arm, wherein the torque adjustment device includes:
- an input unit joined on the motor side so as to be rotatable by driving of the motor,
- an output unit rotatably joined on the robot arm side, and
- a transmission unit disposed between the input unit and the output unit in a manner capable of transmitting power from the input unit to the output unit, where, when an input torque due to rotation of the input unit is at or below a given torque limit value, the input unit and the output unit rotate in an integrated manner to cause a value of an output torque due to rotation of the output unit to be approximately the same as a value of the input torque, and when the input torque exceeds the torque limit value, the value of the output torque is reduced compared with the value of the input torque by slippage allowing relative rotation between the input unit and the output unit, and wherein the control device issues a command to the torque adjustment device to adjust the transmitted torque, according to a desired operation mode of the robot arm.

2. The robot arm control system according to claim 1, wherein the control device allows selection of control according to a first control mode in which position control of the robot arm is performed while taking safety into account, and control according to a second control mode in which force control of the robot arm is performed by adjusting magnitude of the output torque relative to the input torque, wherein in the first control mode, the torque limit value is set slightly greater than the input torque due to rotation of the motor required for the position control of the robot arm, and wherein in the second control mode, the transmitted torque is adjusted so that a target torque for operation of the robot is obtained.

3. The robot arm control system according to claim 2, further comprising an external force detection device for detecting an external force acting on the robot arm, wherein the control device further allows selection of control according to a third control mode in which operation control of the motor and the torque adjustment device is performed for detection of the external force by the external force detection device, and wherein the external force detection device determines the external force based on slippage of the torque adjustment device based on the control in the third control mode.

4. The robot arm control system according to claim 3, wherein the control device performs operation control of the motor and the torque adjustment device such that the torque limit value is gradually reduced without a rotation state of the input unit being changed from a state where the input unit and the output unit are rotated in an integrated manner, and wherein the external force detection device determines the external force by computation, from the torque limit value at a time of start of the slippage.

5. The robot arm control system according to claim 3, wherein the control device performs operation control of the motor and the torque adjustment device such that the input unit and the output unit rotate relative to each other with a rotation state of the input unit being maintained, and wherein the external force detection device determines the external force by computation, based on a relative rotation speed of the slippage.

6. The robot arm control system according to claim 2, wherein in the first control mode, the torque adjustment device is so controlled as to cause a torque transmission be interrupted when slippage of the torque adjustment device is detected, further causing the output unit to freely rotate according to an external force.

* * * * *